United States Patent
Zhou et al.

(10) Patent No.: US 11,552,746 B2
(45) Date of Patent: Jan. 10, 2023

(54) TECHNIQUES FOR CROSS-CARRIER RETRANSMISSION

(71) Applicant: QUALCOMM Incorporated, San Diego, CA (US)

(72) Inventors: Yan Zhou, San Diego, CA (US); Tao Luo, San Diego, CA (US); Seyed Ali Akbar Fakoorian, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/904,207

(22) Filed: Jun. 17, 2020

(65) Prior Publication Data

US 2020/0412487 A1    Dec. 31, 2020

Related U.S. Application Data

(60) Provisional application No. 62/867,645, filed on Jun. 27, 2019.

(51) Int. Cl.
| | |
|---|---|
| *H04W 4/00* | (2018.01) |
| *H04L 1/18* | (2006.01) |
| *H04W 24/08* | (2009.01) |
| *H04L 5/00* | (2006.01) |

(52) U.S. Cl.
CPC .......... *H04L 1/189* (2013.01); *H04L 1/1819* (2013.01); *H04L 1/1861* (2013.01); *H04L 5/001* (2013.01); *H04L 5/0055* (2013.01); *H04W 24/08* (2013.01)

(58) Field of Classification Search
CPC ....... H04L 1/189; H04L 5/001; H04L 1/1819; H04L 1/1861; H04L 5/0055; H04L 1/1893; H04L 1/1822; H04L 5/0044; H04L 5/0094; H04W 24/08
USPC .......................................................... 370/329
See application file for complete search history.

(56) References Cited

U.S. PATENT DOCUMENTS

| | | | |
|---|---|---|---|
| 2009/0279480 A1* | 11/2009 | Rosenqvist | ........... H04L 5/0075 370/328 |
| 2016/0227425 A1* | 8/2016 | Kim | ..................... H04L 5/0007 |
| 2018/0351723 A1* | 12/2018 | Feng | ..................... H04L 1/1854 |

OTHER PUBLICATIONS

ZTE, "Control signaling and HARQ related issues for Licensed-assisted access using LTE", R1-153013, May 25-29, 2015. (From Applicant's IDS) (Year: 2015).*
Co-Pending U.S. Appl. No. 16/904,394, filed Jun. 17, 2020.
(Continued)

*Primary Examiner* — Mang Hang Yeung
(74) *Attorney, Agent, or Firm* — Danai Nelisile Mhembere; Patterson & Sheridan, LLP

(57) ABSTRACT

Certain aspects of the present disclosure provide techniques for cross-carrier retransmission. A method that may be performed by a user equipment (UE) includes monitoring for an initial transmission of data from a network on a first entity, generating a negative acknowledgement message indicating that decoding of the initial transmission of the data was unsuccessful, transmitting the negative acknowledgement message, and monitoring for a retransmission of the data on a second entity after the transmission of the negative acknowledgement message, the second entity being different than the first entity.

51 Claims, 13 Drawing Sheets

(56) References Cited

OTHER PUBLICATIONS

International Search Report and Written Opinion—PCT/US2020/038493—ISA/EPO—dated Sep. 24, 2020.
ZTE: "Control Signalling and HARQ Related Issues for Licensed-Assisted Access Using LTE", 3GPP Draft, R1-153013, 3GPP TSG RAN WG1 Meeting #81, Control Signaling and HARQ Related Issues, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015 (May 24, 2015), XP050972502, pp. 1-4, Retrieved from the Internet: URL: http://www.3gpp.org/ftp/Meetings_3GPP_SYNC/RAN1/Docs/ [retrieved on May 24, 2015].

* cited by examiner

TECHNIQUES FOR CROSS-CARRIER RETRANSMISSION

CROSS-REFERENCE TO RELATED APPLICATION(S)

This application claims benefit of and priority to U.S. Provisional Application No. 62/867,645, filed Jun. 27, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for data retransmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects are directed to a method for wireless communication. The method generally includes monitoring for an initial transmission of data from a network on a first entity, generating a negative acknowledgement message indicating that decoding of the initial transmission of the data was unsuccessful, transmitting the negative acknowledgement message, and monitoring for a retransmission of the data on a second entity after the transmission of the negative acknowledgement message, the second entity being different than the first entity.

Certain aspects are directed to a method for wireless communication. The method generally includes transmitting an initial transmission of data to a user-equipment (UE) on a first entity, receiving a negative acknowledgement message indicating that decoding of the initial transmission of the data was unsuccessful; and transmitting a retransmission of the data on a second entity after the transmission of the negative acknowledgement message, the second entity being different than the first entity.

Certain aspects are directed to a method for wireless communication. The method generally includes transmitting an initial transmission of data to a network on a first entity, generating a retransmission of the data, and transmitting the retransmission of the data on a second entity, the second entity being different than the first entity.

Certain aspects are directed to a method for wireless communication. The method generally includes monitoring for an initial transmission of data from a UE on a first entity, and receiving a retransmission of the data on a second entity, the second entity being different than the first entity.

Certain aspects are directed to an apparatus for wireless communication. The apparatus generally includes a memory and one or more processors coupled to the memory, the one or more processors and the memory being configured to: monitor for an initial transmission of data from a network on a first entity, generate a negative acknowledgement message indicating that decoding of the initial transmission of the data was unsuccessful, transmit the negative acknowledgement message, and monitor for a retransmission of the data on a second entity after the transmission of the negative acknowledgement message, the second entity being different than the first entity.

Certain aspects are directed to an apparatus for wireless communication. The apparatus generally includes means for monitoring for an initial transmission of data from a network on a first entity, means for generating a negative acknowledgement message indicating that decoding of the initial transmission of the data was unsuccessful, means for transmitting the negative acknowledgement message, and means for monitoring for a retransmission of the data on a second entity after the transmission of the negative acknowledgement message, the second entity being different than the first entity.

Certain aspects are directed to a computer readable medium. The computer readable medium generally includes code for monitoring for an initial transmission of data from a network on a first entity, code for generating a negative acknowledgement message indicating that decoding of the initial transmission of the data was unsuccessful, code for transmitting the negative acknowledgement message, and code for monitoring for a retransmission of the data on a second entity after the transmission of the negative acknowledgement message, the second entity being different than the first entity.

Certain aspects are directed to an apparatus for wireless communication. The apparatus generally includes a memory and one or more processors coupled to the memory, the one or more processors and the memory being configured to: transmit an initial transmission of data to a user-equipment (UE) on a first entity, receive a negative acknowledgement message indicating that decoding of the initial transmission of the data was unsuccessful, and transmit a retransmission of the data on a second entity after the transmission of the negative acknowledgement message, the second entity being different than the first entity.

Certain aspects are directed to an apparatus for wireless communication. The apparatus generally includes means for transmitting an initial transmission of data to a UE on a first entity, means for receiving a negative acknowledgement message indicating that decoding of the initial transmission of the data was unsuccessful, and means for transmitting a retransmission of the data on a second entity after the transmission of the negative acknowledgement message, the second entity being different than the first entity.

Certain aspects are directed to a computer readable medium. The computer readable medium generally includes code for transmitting an initial transmission of data to a UE on a first entity, code for receiving a negative acknowledgement message indicating that decoding of the initial transmission of the data was unsuccessful, and code for transmitting a retransmission of the data on a second entity after the transmission of the negative acknowledgement message, the second entity being different than the first entity.

Certain aspects are directed to an apparatus for wireless communication. The apparatus generally includes a memory and one or more processors coupled to the memory, the one or more processors and the memory being configured to: transmit an initial transmission of data to a network on a first entity, generate a retransmission of the data, and transmit the retransmission of the data on a second entity, the second entity being different than the first entity.

Certain aspects are directed to an apparatus for wireless communication. The apparatus generally includes means for transmitting an initial transmission of data to a network on a first entity, means for generating a retransmission of the data, and means for transmitting the retransmission of the data on a second entity, the second entity being different than the first entity.

Certain aspects are directed to a computer readable medium. The computer readable medium generally includes code for transmitting an initial transmission of data to a network on a first entity, code for generating a retransmission of the data, and code for transmitting the retransmission of the data on a second entity, the second entity being different than the first entity.

Certain aspects are directed to an apparatus for wireless communication. The apparatus generally includes a memory and one or more processors coupled to the memory, the one or more processors and the memory being configured to: monitor for an initial transmission of data from a UE on a first entity, and receive a retransmission of the data on a second entity, the second entity being different than the first entity.

Certain aspects are directed to an apparatus for wireless communication. The apparatus generally includes means for monitoring for an initial transmission of data from a UE on a first entity, and means for receiving a retransmission of the data on a second entity, the second entity being different than the first entity.

Certain aspects are directed to a computer readable medium. The computer readable medium generally includes code for monitoring for an initial transmission of data from a UE on a first entity and code for receiving a retransmission of the data on a second entity, the second entity being different than the first entity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for cross-carrier retransmission. For example, an initial data transmission may be scheduled on a first entity using semi-persistent scheduling (SPS) or a configured grant (CG). As used herein, the term "entity" generally refers to a frequency resource, a cell, or a component carrier (CC). Upon failure of the decoding of the data transmission (e.g., at a user-equipment) on the first entity (e.g., a first CC, a retransmission of the data may be configured on a second entity (e.g., another CC) that is different than the first entity. In some cases, control information may be sent to a user-equipment (UE) (e.g., on the first entity or the second entity) scheduling the data retransmission. In other aspects, the data retransmission may be preconfigured. In other words, the UE may automatically implement the data retransmission on the second entity upon failure of decoding the initial transmission.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
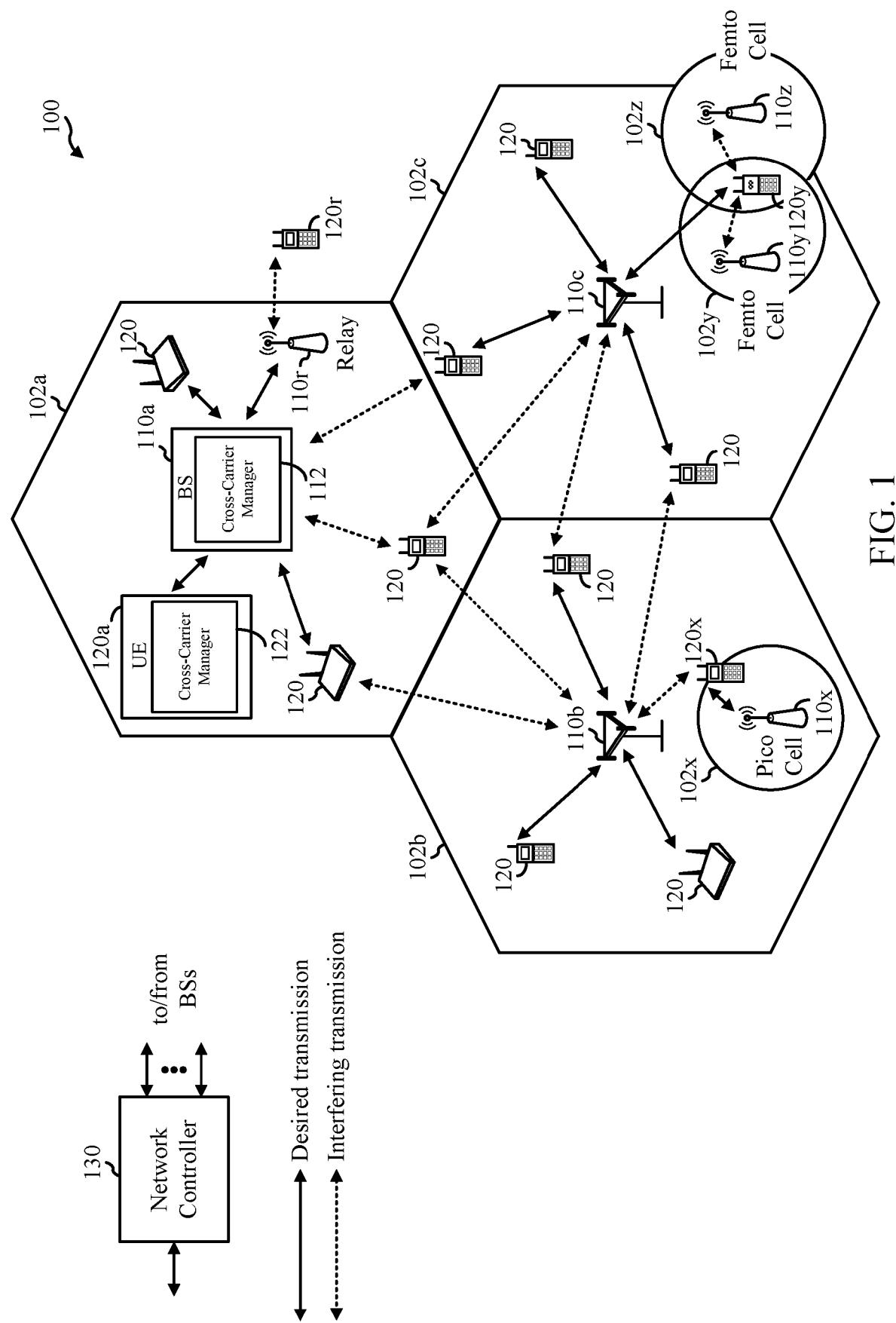
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for cross-carrier retransmission. As shown in FIG. 1, the BS 110a includes a cross-carrier manager 112. The cross-carrier manager 112 may be configured to perform cross-carrier retransmission, in accordance with aspects of the present disclosure. As shown in FIG. 1, the UE 120a includes a cross-carrier manager 122. The cross-carrier manager 122 may be configured to configure cross-carrier retransmissions, in accordance with aspects of the present disclosure. For instance, cross-carrier manager 112 may transmit an initial transmission of data to a user-equipment (UE) on a first entity, receive a negative acknowledgement message indicating that decoding of the initial transmission of the data was unsuccessful, and transmit a retransmission of the data on a second entity after the transmission of the negative acknowledgement message, the second entity being different than the first entity. In certain aspects, the cross-carrier manager 122 at the UE may monitor for an initial transmission of data from a network on a first entity, generate a negative acknowledgement message indicating that decoding of the initial transmission of the data was unsuccessful, transmit the negative acknowledgement message, and monitor for a retransmission of the data on a second entity after the transmission of the negative acknowledgement message, the second entity being different than the first entity.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
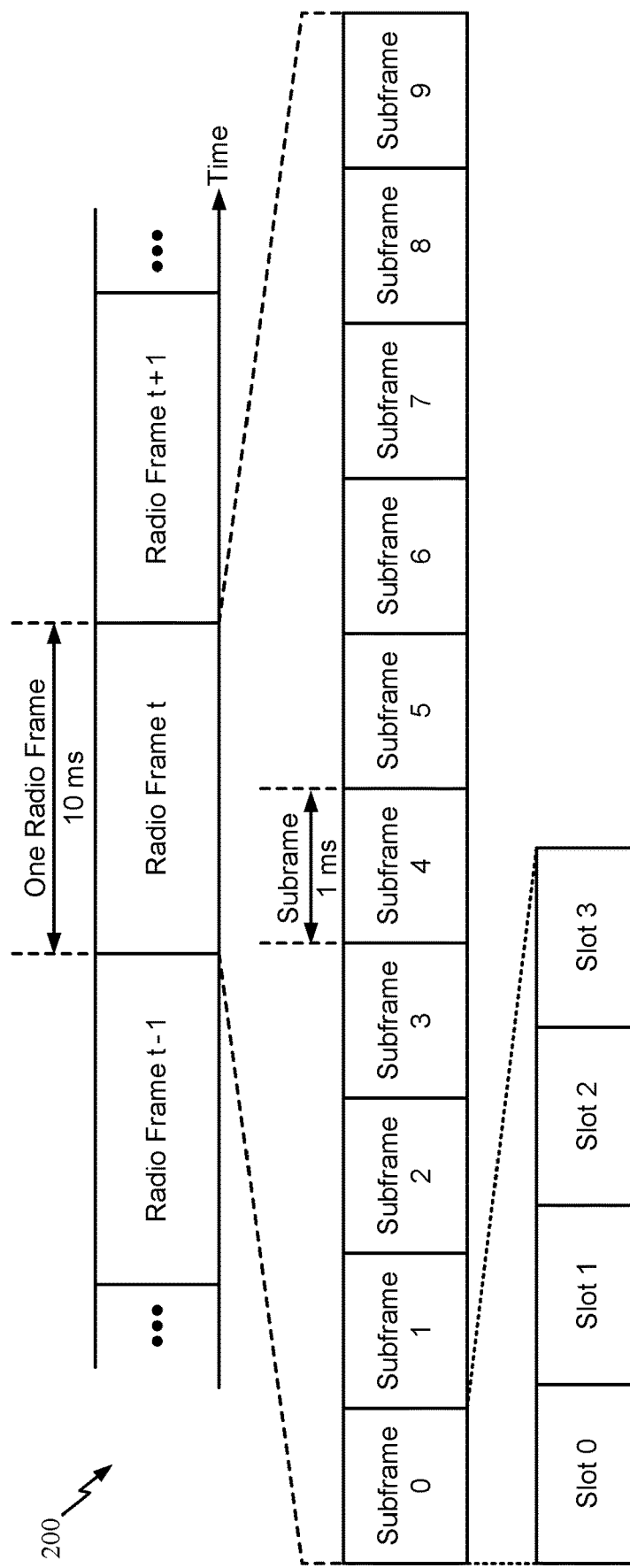
FIG. 2 is a diagram showing an example of a frame format 200.

FIG. 2 is a diagram showing an example of a frame format 200. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects, a subframe of the frame format 200 may be implemented using cross-carrier scheduling, as described in more detail herein.

Figure 3:
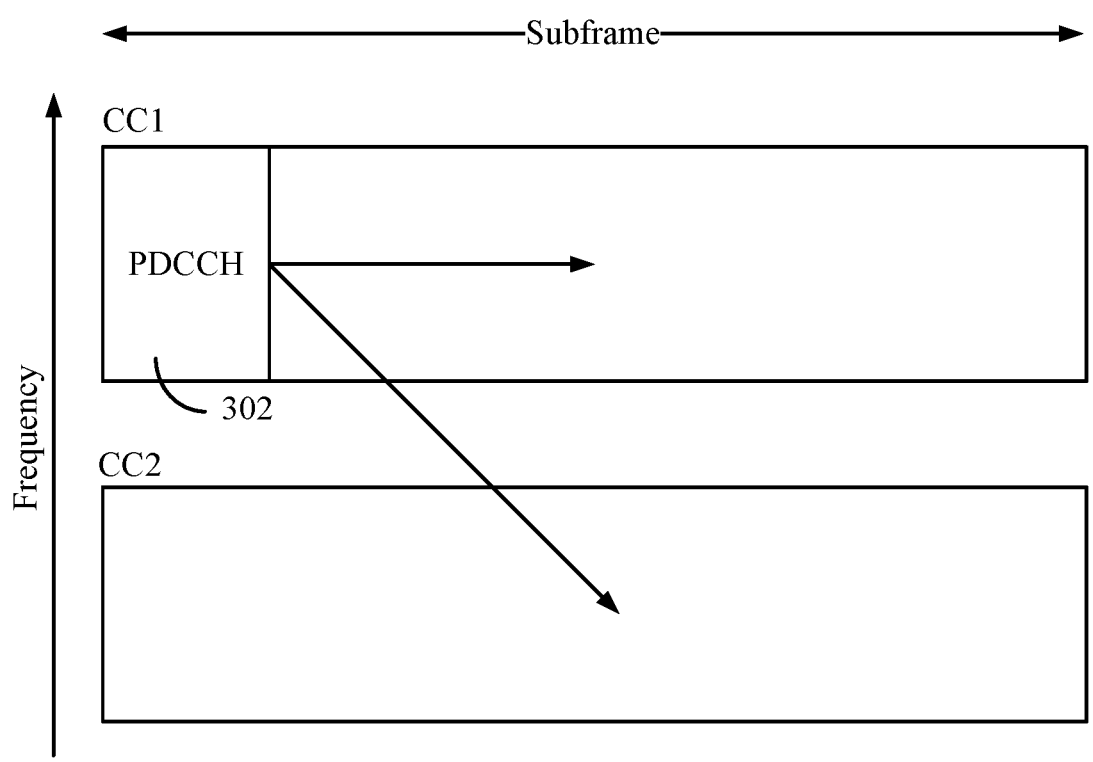
FIG. 3 illustrates example operations for cross-carrier scheduling.

FIG. 3 illustrates example operations for cross-carrier scheduling. As illustrated, the first component carrier (CC1) may include a physical downlink control channel (PDCCH) 302 that includes control information applicable to both CC1 and the second component carrier (CC2). For instance, CC1 may schedule resources for data transmission in both CC1 and CC2. CC1 may be referred to as the scheduling CC and CC2 may be referred to as the scheduled CC. Each component carrier is associated with a cell. While only two CCs are illustrated in FIG. 3, any number of CCs may be implemented, each of the CCs being associated with a frequency range (FR). In some cases, multiple CCs may be part of the same FR. For instance, CC1 may use a first FR (FR1) and CC2 may use a second FR (FR2). A configuration of each FR may be different. For instance, FR1 may have a smaller bandwidth (BW) than FR2, yet have less blocking issues. FR1 may have a lower sub-carrier spacing (SCS) than FR2. For example, FR1 may have a SCS of 60, whereas FR2 may have a SCS of 120.

Example Techniques for Cross-Carrier Retransmission

In release 15 and release 16 of the third generation partnership program (3GPP), each hybrid automatic repeat request (HARQ) process is implemented per cell and a transport (TB) may not be retransmitted on a cell that is different than the originating cell of the TB. A TB generally refers to a payload (or data) for the physical layer. In certain aspects of the present disclosure, a failed physical downlink shared channel (PDSCH) (e.g., data) transmitted on a frequency range (e.g., FR2) may be retransmitted on a different FR (e.g., FR1) to improve communication robustness. For example, data retransmission may be implemented on FR1 via cross-carrier scheduling from FR2 to FR1. For instance, control information on FR2 may be used to schedule resources for retransmission of the PDSCH on FR1. As another example, to improve control signaling robustness, retransmission may be on FR1 via self-carrier scheduling on FR1, as described in more detail herein.

Figure 4:
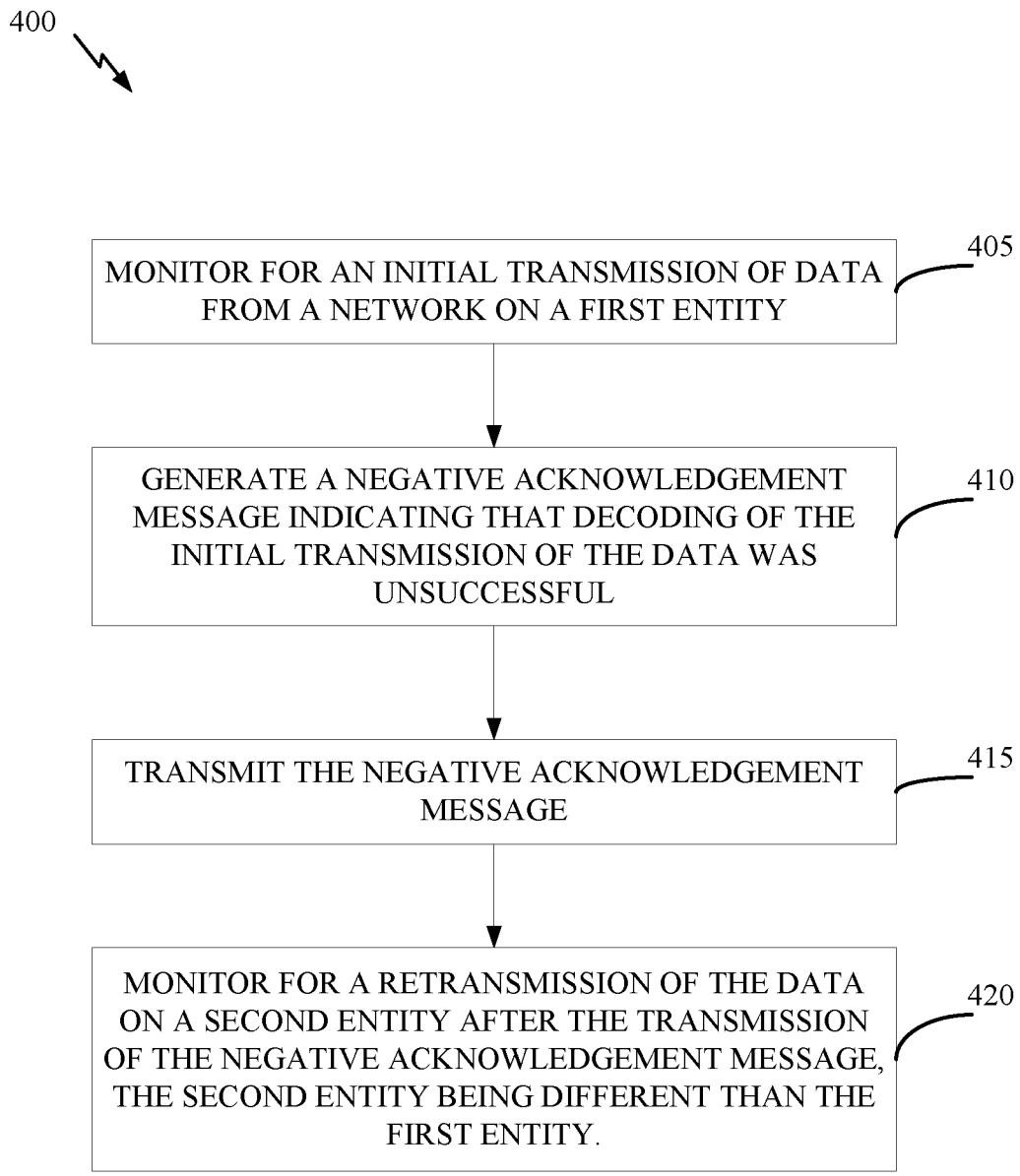
FIG. 4 is a flow diagram illustrating example operations for wireless communication by a user equipment (UE), in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100).

Figure 13:
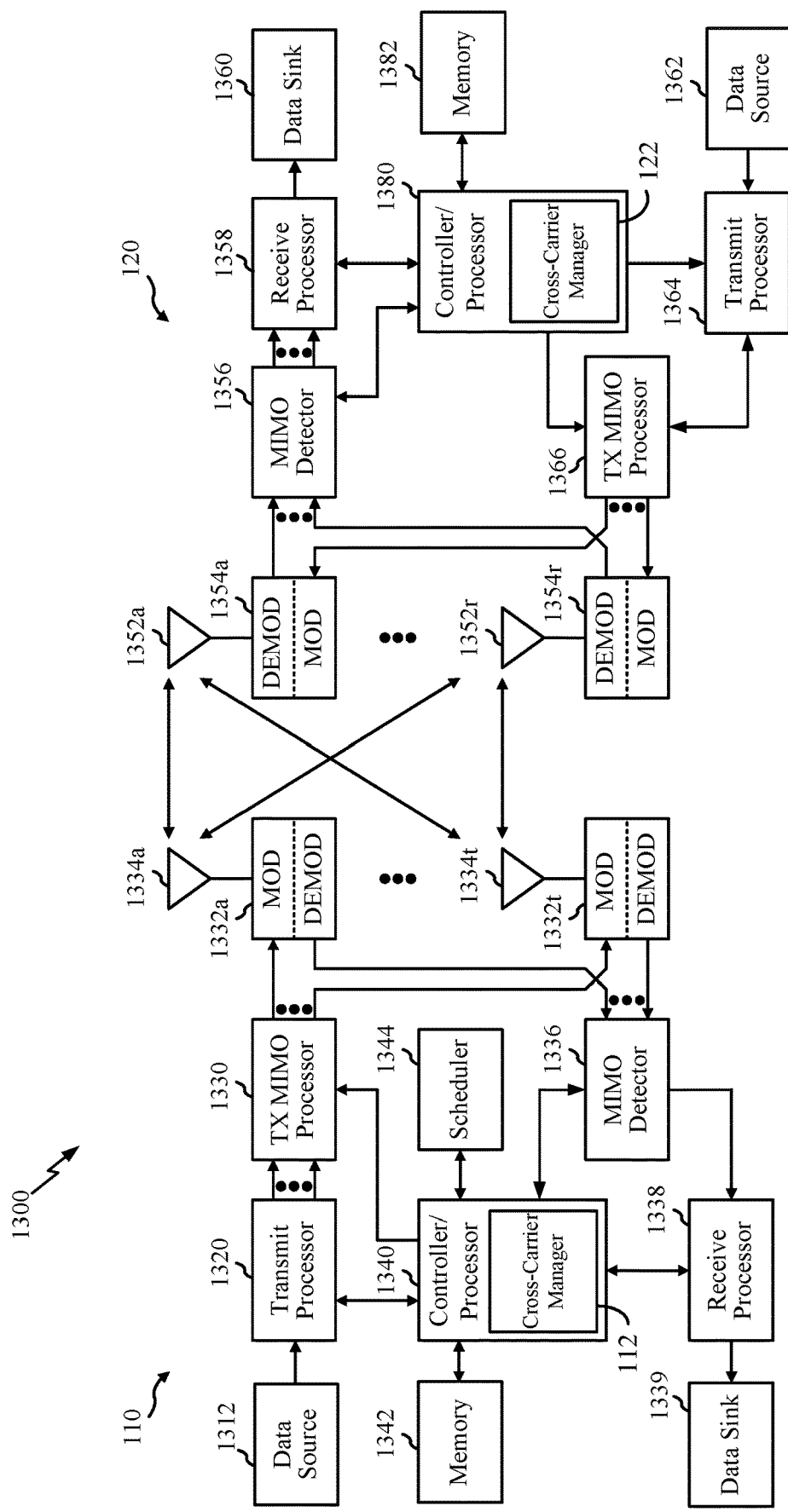
FIG. 13 is a block diagram conceptually illustrating a design of an example BS and UE, in accordance with certain aspects of the present disclosure.

Operations 400 may be implemented as software components that are executed and run on one or more processors (e.g., controller/processor 1380 of FIG. 13). Further, the transmission and reception of signals by the UE in operations 400 may be enabled, for example, by one or more antennas (e.g., antennas 1352 of FIG. 13). In certain aspects, the transmission and/or reception of signals by the UE may be implemented via a bus interface of one or more processors (e.g., controller/processor 1380) obtaining and/or outputting signals.

The operations 400 may begin, at block 405, with the UE monitoring for an initial transmission of data from a network on a first entity (e.g., a first frequency resource, CC, or cell), and at block 410, generating a negative acknowledgement message indicating that decoding of the initial transmission of the data was unsuccessful. As used herein, the term "entity" generally refers to a frequency resource, a cell, or a component carrier (CC). At block 415, the UE may transmit the negative acknowledgement message, and at block 420, monitor for a retransmission of the data on a second entity (e.g., as second frequency resource, CC, or cell) after the transmission of the negative acknowledgement message, the second entity being different than the first entity.

In certain aspects, the UE 120 may also receive control information (e.g., from BS 110) indicating the second entity to be monitored for receiving the retransmission of the data. For example, the control information may be received via the first entity (e.g., for cross-carrier scheduling), as described in more detail with respect to FIG. 6A. As another example, the control information may be received via the second entity (e.g., for self-carrier scheduling), as described in more detail with respect to FIG. 6B.

In certain aspects, the control information may include a hybrid automatic repeat request (HARQ) process identifier (ID) indicating the initial transmission of the data corresponding to the retransmission, and a HARQ anchoring entity ID associated with the HARQ process ID. In this case, the UE may decode the data by combining the data and the retransmission of the data based on the HARQ process ID and the HARQ anchoring entity ID, as described in more detail herein. In other words, the UE may identify the initial transmission of the data to be combined with the retransmission of the data using the HARQ process ID and the HARQ anchoring entity ID.

In some cases, the UE may generate an acknowledgment/negative acknowledgment (A/N) message indicating whether the retransmission of the data was successfully decoded, and transmit the A/N message to the network. The A/N message may be transmitted via a third entity. The third entity may be configured for the first entity. In certain aspects, the third entity may be configured for the second entity. For example, the third entity may be a physical uplink control channel (PUCCH) transmission cell configured for a first cell (first entity) receiving the PDSCH initial transmission on FR2, or a PUCCH transmission cell configured for a second cell (second entity) receiving the PDSCH retransmission on FR1.

In certain aspects, the UE may be preconfigured to monitor the second entity to receive the retransmission of the data after the transmission of the negative acknowledgment message. In some cases, the UE may receive (e.g., from BS 110) an indication of coordinating entities on which the retransmission of the data may be received, the coordinating entities including the second entity. In certain aspects, the first entity may be part of an unlicensed spectrum, and the second entity may be part of a licensed spectrum.

In certain aspects, the UE may monitor the first entity for one or more other transmissions after monitoring for the retransmission of the data. In this case, the UE may receive an indication, on the second entity, of when to begin monitoring the first entity for the one or more other transmissions. In some cases, the monitoring of the first entity for the one or more other transmissions may begin upon expiration of a timer. The timer may start after the initial transmission or after switching to the second entity for monitoring of the retransmission of the data. In some cases, the retransmission of the data may be received during a retransmission cycle, and the monitoring of the first entity for the one or more other transmissions may begin at an end of the retransmission cycle.

Figure 5:
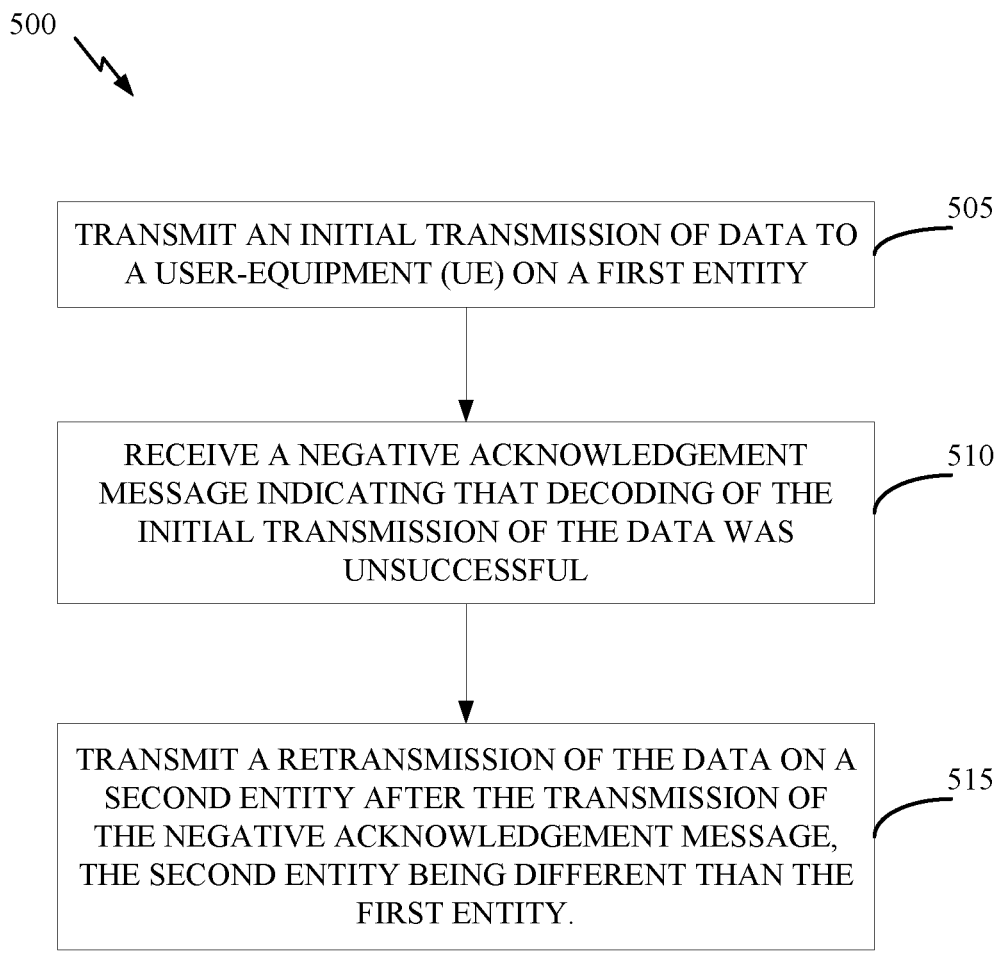
FIG. 5 is a flow diagram illustrating example operations for wireless communication by a base station (BS), in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complimentary operations by the BS to the operations 400 performed by the UE.

Operations 500 may be implemented as software components that are executed and run on one or more processors (e.g., controller/processor 1340 of FIG. 13). Further, the transmission and reception of signals by the BS in operations 500 may be enabled, for example, by one or more antennas (e.g., antennas 1334 of FIG. 13). In certain aspects, the transmission and/or reception of signals by the BS may be implemented via a bus interface of one or more processors (e.g., controller/processor 1340) obtaining and/or outputting signals.

The operations 500 may begin at block 505, by transmitting an initial transmission of data to a UE on a first entity, and at block 510, receiving a negative acknowledgement message indicating that decoding of the initial transmission of the data was unsuccessful. At block 515, the BS may transmit a retransmission of the data on a second entity after the transmission of the negative acknowledgement message, the second entity being different than the first entity.

Figure 6A:
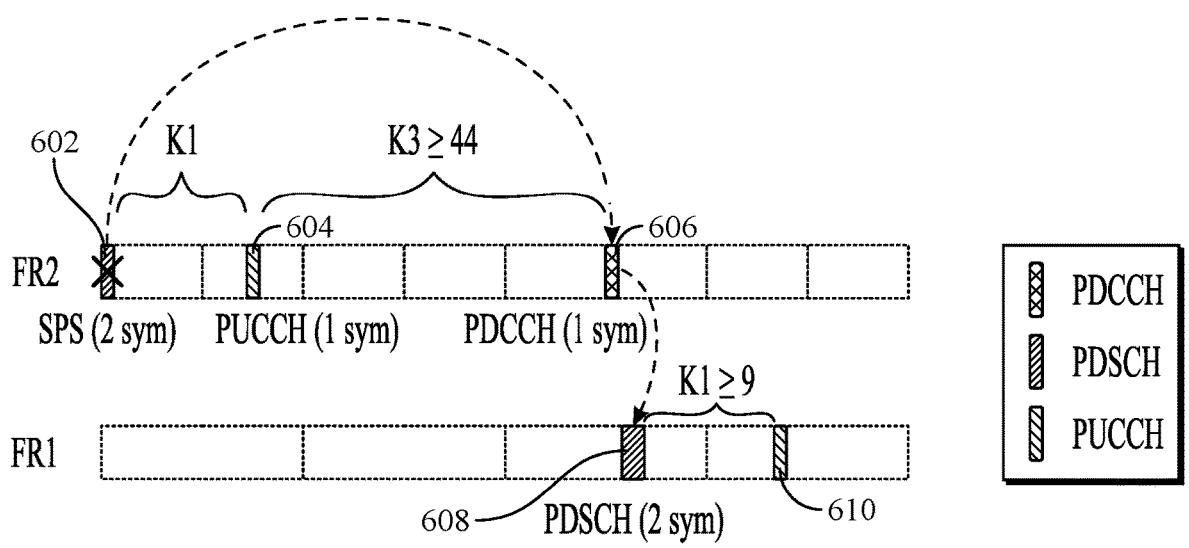
FIGS. 6A and 6B illustrate downlink data cross-carrier retransmission, in accordance with certain aspects of the present disclosure.
Figure 6B:
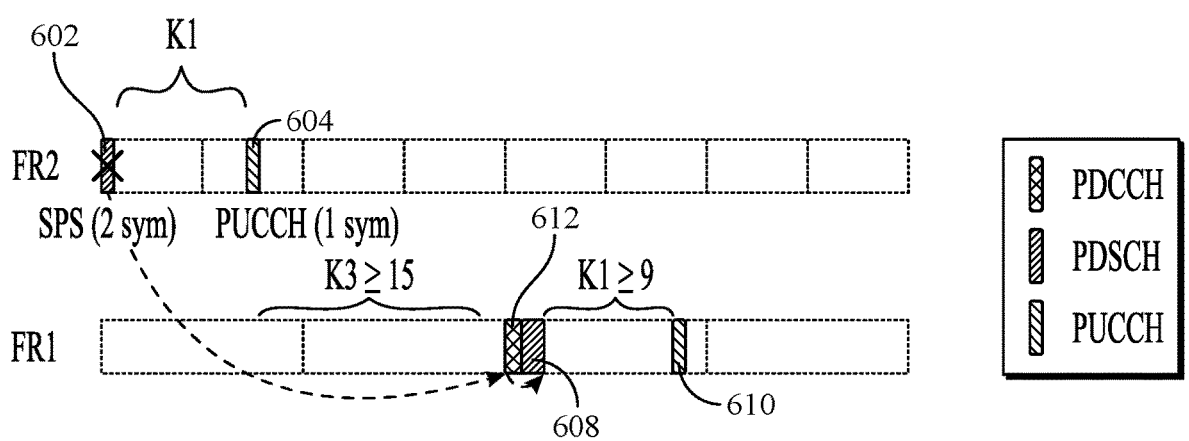

FIGS. 6A and 6B illustrate a downlink data cross-carrier retransmission, in accordance with certain aspects of the present disclosure. As illustrated in FIG. 6A, cross-carrier retransmission may be implemented using cross-carrier scheduling. For example, a PDSCH 602 may be transmitted on FR2. The PDSCH 602 may be scheduled using semi-persistent scheduling (SPS). In certain aspects, a PUCCH 604 may be transmitted on FR2. The PUCCH 604 may include an A/N signaling indicating whether the PDSCH 602 was successfully decoded. As illustrated, decoding of the PDSCH 602 may have failed. Thus, the PUCCH 604 may indicate a negative acknowledgement.

In certain aspects, a physical downlink control channel (PDCCH) 606 may be received on the same FR (FR2) as the initial data transmission (e.g., PDSCH 602). The PDCCH may schedule resources for a retransmission of the PDSCH 602 (e.g., the data retransmission 608) on FR1. FR1 may have a lower sub-carrier spacing (SCS) than FR2. For example, FR1 may have a SCS of 60, whereas FR2 may have a SCS of 120.

In certain aspects, another A/N message (e.g., PUCCH 610) may be transmitted indicating whether the data retransmission 608 has decoded successfully, as illustrated. As illustrated in FIG. 6B, cross-carrier retransmission may be implemented using self-carrier scheduling. In other words, a PDCCH 612 may be received on the same FR (FR1) as the data retransmission. For example, the PDCCH 612 on FR1 may schedule the resources on FR1 for the PDSCH (data retransmission 608).

While certain examples provided herein have described cross-carrier retransmission of downlink data to facilitate understanding, cross-carrier retransmission may be used to retransmit uplink data. For instance, a physical uplink shared channel (PUSCH) may be retransmitted on a different entity than the initial transmission of the PUSCH, as described in more detail herein.

Figure 7:
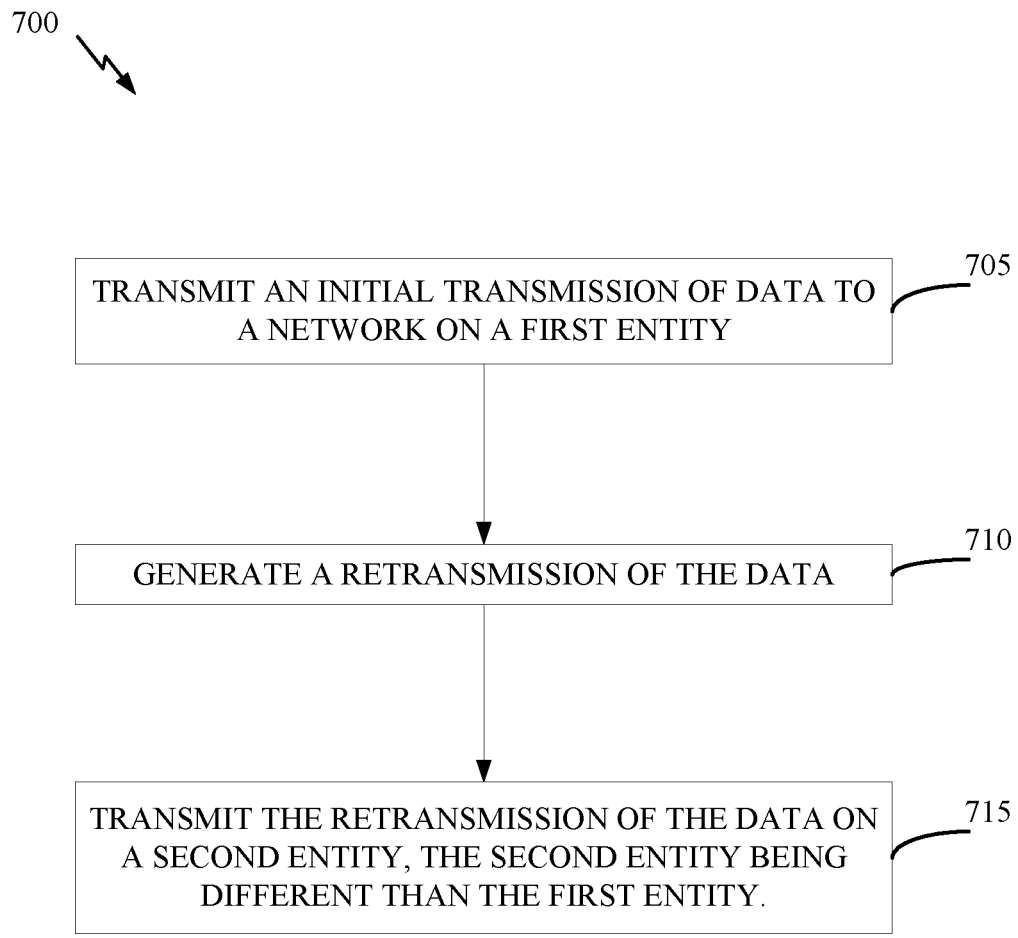
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as a UE 120a in the wireless communication network 100).

Operations 700 may be implemented as software components that are executed and run on one or more processors (e.g., controller/processor 1380 of FIG. 13). Further, the transmission and reception of signals by the UE in operations 700 may be enabled, for example, by one or more antennas (e.g., antennas 1352 of FIG. 13). In certain aspects, the transmission and/or reception of signals by the UE may be implemented via a bus interface of one or more processors (e.g., controller/processor 1380) obtaining and/or outputting signals.

The operations 700 may begin at block 705, by the UE transmitting an initial transmission of data to a network on a first entity, and at block 710, generating a retransmission of the data. At block 715, the UE may transmit the retransmission of the data on a second entity, the second entity being different than the first entity.

In certain aspects, the UE may receive control information indicating the second entity to be used for transmitting the retransmission of the data. In some cases, the control information may be received via the first entity. As another example, the control information may be received via the second entity.

In certain aspects, the control information may include a HARQ process ID indicating the initial transmission of the data corresponding to the retransmission. The control information may also include a HARQ anchoring entity ID associated with the HARQ process ID. In certain aspects, the UE may be preconfigured to transmit, via the second entity, the retransmission of the data. In certain aspects, the UE may receive an indication of coordinating entities on which the retransmission of the data may be transmitted, the coordinating entities comprising the second entity. In some cases, the first entity may be part of an unlicensed spectrum, and the second entity may be part of a licensed spectrum.

Figure 8:
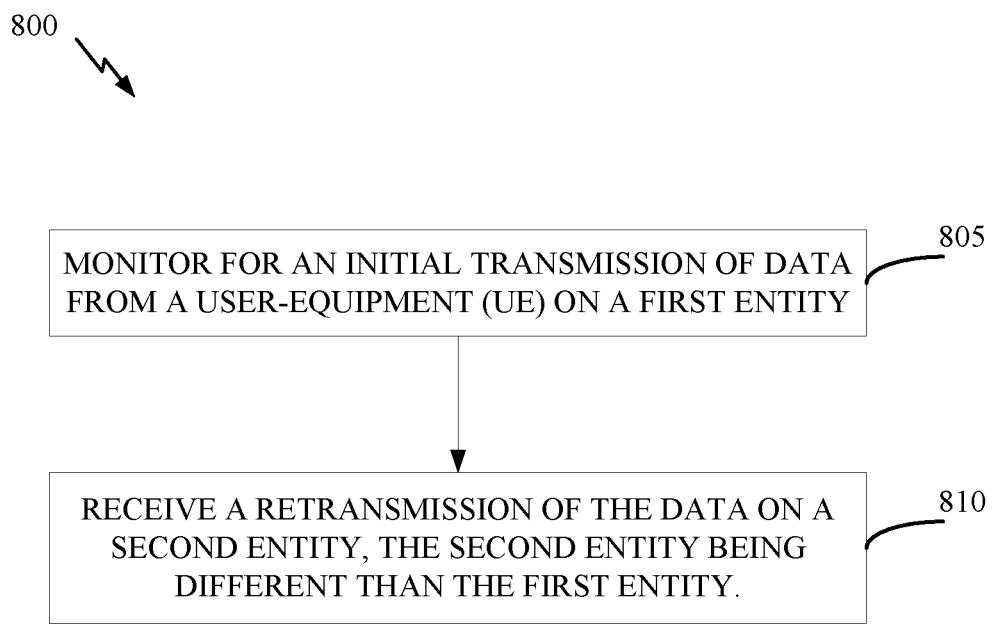
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110a in the wireless communication network 100). The operations 800 may be complimentary operations by the BS to the operations 700 performed by the UE.

Operations 800 may be implemented as software components that are executed and run on one or more processors (e.g., controller/processor 1340 of FIG. 13). Further, the transmission and reception of signals by the BS in operations 800 may be enabled, for example, by one or more antennas (e.g., antennas 1334 of FIG. 13). In certain aspects, the transmission and/or reception of signals by the BS may be implemented via a bus interface of one or more processors (e.g., controller/processor 1340) obtaining and/or outputting signals. The operations 800 may begin, at block 805, by the BS monitoring for an initial transmission of data from a UE on a first entity, and at block 810, receiving a retransmission of the data on a second entity, the second entity being different than the first entity.

Figure 9A:
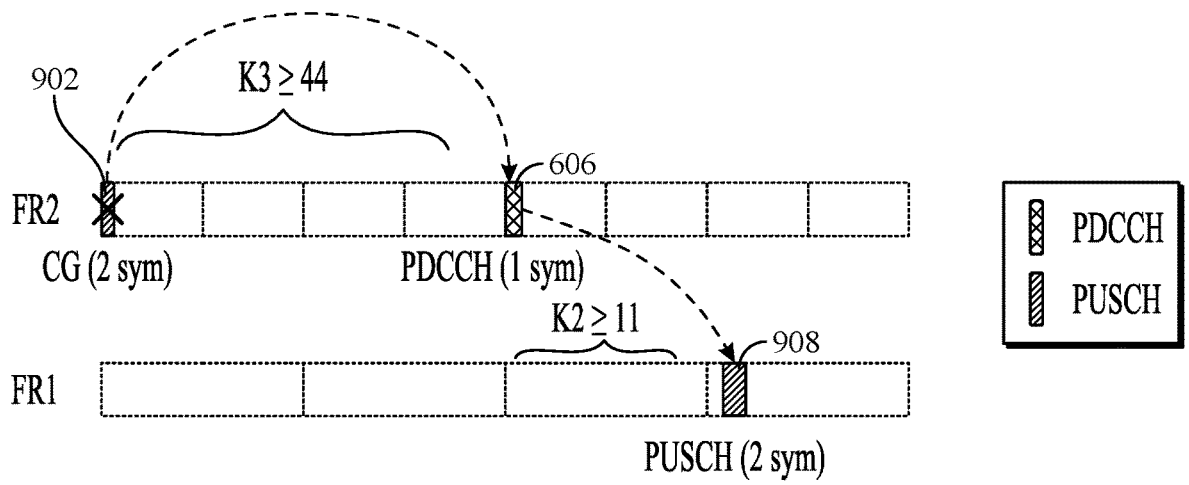
FIGS. 9A and 9B illustrate uplink data cross-carrier retransmission, in accordance with certain aspects of the present disclosure.
Figure 9B:
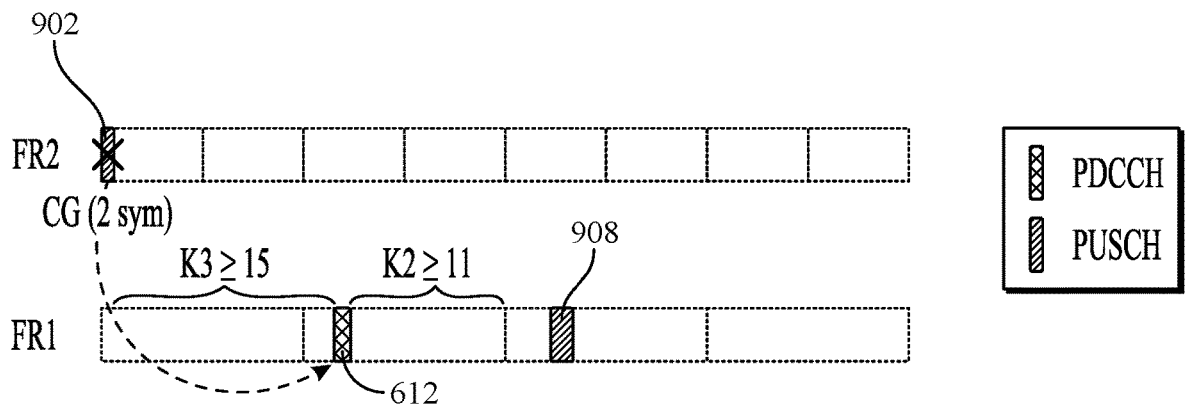

FIGS. 9A and 9B illustrate an uplink data cross-carrier retransmission, in accordance with certain aspects of the present disclosure. As illustrated in FIG. 9A, cross-carrier uplink data retransmission may be implemented using cross-carrier scheduling. A PUSCH 902 (e.g., initial data transmission) may be transmitted on FR2. The PUSCH 902 may be scheduled using a configured grant (CG). As illustrated, decoding of the PUSCH 902 may have failed at the BS. In certain aspects, a PDCCH 606 may be received on the same FR (FR2) as the initial data transmission (e.g., PUSCH 902). The PDCCH 606 may schedule resources for a retransmission of the PUSCH 902 (e.g., the data retransmission (PUSCH 908)) on FR1. As illustrated in FIG. 9B, cross-carrier retransmission may be implemented using self-carrier scheduling. In other words, a PDCCH 612 may be received on the same FR (FR1) as the data retransmission (e.g., PUSCH 908). For example, the PDCCH 612 on FR1 may schedule the resources on FR1 for the PUSCH 908 (data retransmission).

Figure 10:
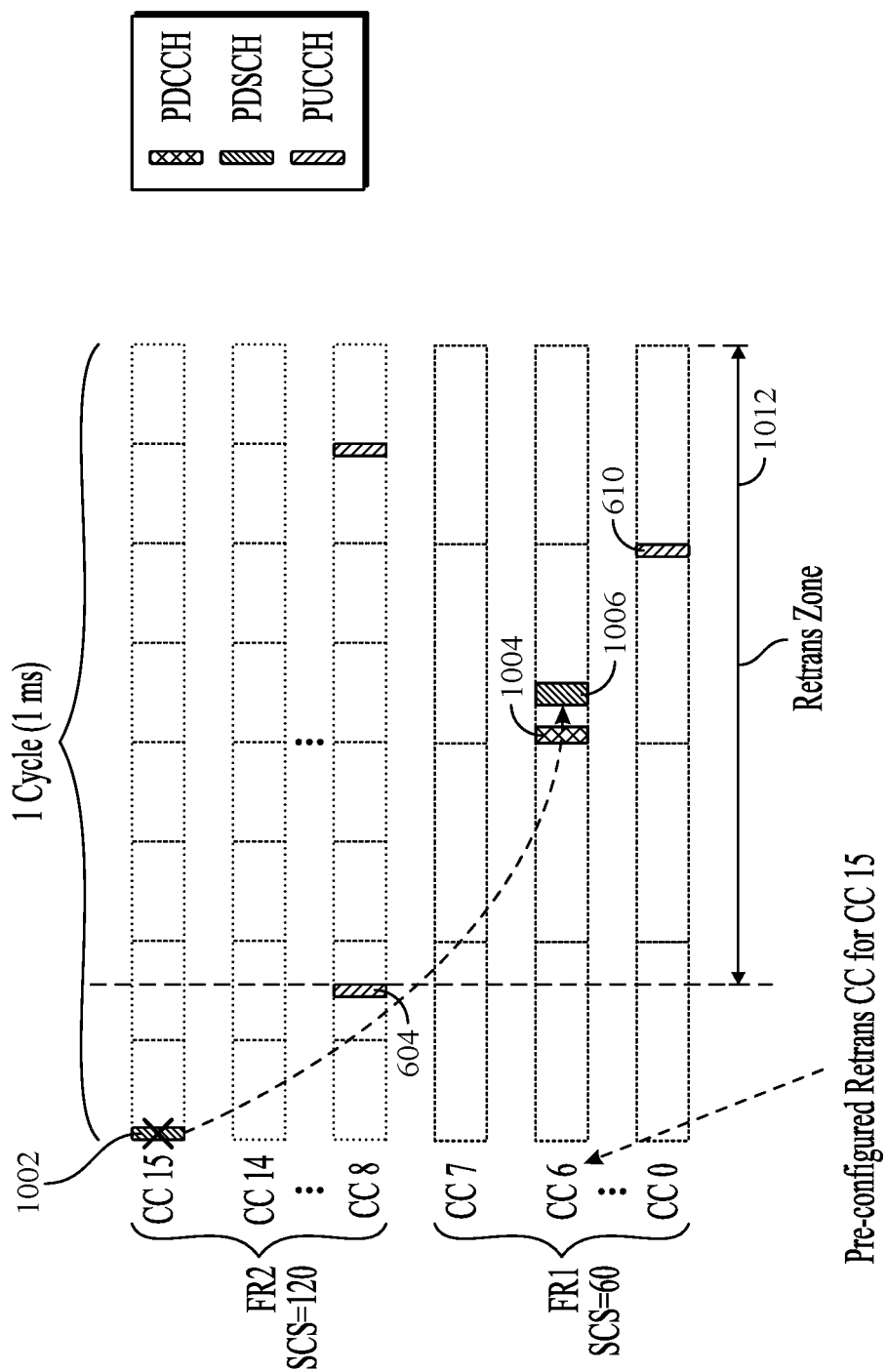
FIG. 10 illustrates uplink or downlink data retransmission preconfigured on a different CC as the initial data transmission, in accordance with certain aspects of the present disclosure.

FIG. 10 illustrates uplink or downlink data retransmission preconfigured on a different CC (or FR) as the initial data transmission, in accordance with certain aspects of the present disclosure. For example, retransmission may be pre-configured on a different CC as the initial data transmission. For instance, initial transmission may be on FR2 (e.g., CC 15 of FR2). If the initial transmission fails, the UE automatically goes to (e.g., begins monitoring) FR1 to receive or transmit the data retransmission. For instance, the initial data transmission 1002 may be on CC15, as illustrated. Once the initial data transmission 1002 is determined to have failed, the UE automatically begins monitoring CC6 to receive the data retransmission 1006 for downlink or transmits the data retransmission 1006 on CC6 for uplink. In certain aspects, a PDCCH 1004 may be received on the same CC (e.g., CC6) as the data retransmission 1006.

In certain aspects, the initial transmission cell (e.g., CC15) may be on an unlicensed spectrum, while the retransmission cell (e.g., CC6) may be on a licensed spectrum. In certain aspects, the time for switching back to the initial transmission cell (e.g., to monitor for other transmissions) may be indicated via the retransmission cell (e.g., CC6). In certain aspects, the time for switching back to the initial transmission cell may be indicated by a timer. The timer may start after switching to the retransmission cell (e.g., CC6) or after the initial transmission. In certain aspects, the time for switching back to the initial transmission cell may be at a pre-configured time (e.g., at the end of every cycle). For instance, the time for switching back to the initial transmission cell may be at the end of the retransmission zone 1012.

In certain aspects, a HARQ-anchoring cell ID may be used to facilitate data retransmission. For instance, to allow for combining of data transmissions having the same HARQ ID, downlink control information (DCI) (e.g., PDCCH 612) scheduling DL/UL cross-carrier retransmission may indicate the cell ID (e.g., the HARQ-anchoring cell ID) originally possessing the HARQ ID. In otherwords, the DCI (e.g., PDCCH 612) may include a HARQ ID indicating the initial data retransmission associated with the data retransmission, as well as a HARQ-anchoring cell ID corresponding to the cell on which the initial transmission was sent. For downlink, the UE may combine the initial data transmission and the retransmission with the same HARQ-anchoring Cell ID and HARQ ID across different PDSCH receiving cells. For uplink, the UE may (re)transmit the same TB (e.g., data or payload) with the same HARQ-anchoring cell ID and HARQ ID across different PUSCH transmitting cells.

In certain aspects, a PUCCH group may be implemented for cross-carrier retransmission. For example, for DL cross-carrier retransmission, the corresponding A/N message may use the PUCCH group configured for the PDSCH receiving cell. For instance, if PDSCH (e.g., data retransmission 608) is received on the FR1 cell, PUCCH group configured for this FR1 cell may be used for the A/N message transmission (e.g., PUCCH 610). That is, the A/N message transmission may also be transmitted on the FR1 cell. Alternatively, the PUCCH group configured for the HARQ-anchoring cell may be used. For example, the A/N message may be transmitted on FR2 used for the initial data transmission (e.g., PDSCH 602).

In certain aspects, coordinating cells may be implemented for cross-carrier retransmission, as described herein. For a given HARQ-anchoring cell, the BS may indicate a group of coordinating cells for potential DL/UL cross-carrier retransmission. The indication of the coordinating cells may allow the UE to build internal paths to distribute TB (data) between the retransmission cell and the anchoring cell.

Example Aspects

In a first aspect, a method for wireless communication, comprises: monitoring for an initial transmission of data from a network on a first entity; generating a negative acknowledgement message indicating that decoding of the initial transmission of the data was unsuccessful; transmitting the negative acknowledgement message; and monitoring for a retransmission of the data on a second entity after the transmission of the negative acknowledgement message, the second entity being different than the first entity.

In a second aspect, in combination with a first aspect, each of the first entity and the second entity is a frequency resource.

In a third aspect, in combination with one or more of the first aspect and the second aspect, each of the first entity and the second entity is a cell or a component carrier.

In a fourth aspect, in combination with one or more of the first aspect through the third aspect, the method further comprises receiving control information indicating the second entity to be monitored for receiving the retransmission of the data.

In a fifth aspect, in combination with the fourth aspect, the control information is received via the first entity.

In a sixth aspect, in combination with one or more of the fifth aspect and the fourth aspect, the control information is received via the second entity.

In a seventh aspect, in combination with one or more of the fourth aspect through the sixth aspect, the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID.

In an eighth aspect, in combination with a seventh aspect, the method further comprises decoding the data by combining the data and the retransmission of the data based on the HARQ process ID and the HARQ anchoring entity ID.

In a ninth aspect, in combination with one or more of the first aspect through the eighth aspect, the method further comprises: generating an acknowledgment/negative acknowledgment (A/N) message indicating whether the retransmission of the data was successfully decoded; and transmitting the A/N message to the network.\

In a tenth aspect, in combination with the ninth aspect, the A/N message is transmitted via a third entity.

In an eleventh aspect, in combination with a tenth aspect, the third entity is configured for the first entity.

In a twelfth aspect, in combination with one or more of an eleventh aspect and a tenth aspect, the third entity is configured for the second entity.

In a thirteenth aspect, in combination with one or more of the tenth aspect through the twelfth aspect, the third entity is a frequency resource.

In a fourteenth aspect, in combination with one or more of the tenth aspect through the thirteenth aspect, the third entity is a cell or a component carrier.

In a fifteenth aspect, in combination with one or more of the first aspect through the fourteenth aspect, the method is performed by a user-equipment (UE), the UE being preconfigured to monitor the second entity to receive the retransmission of the data after the transmission of the negative acknowledgment message.

In a sixteenth aspect, in combination with one or more of the first aspect through the fifteenth aspect, the method further comprises receiving an indication of coordinating entities on which the retransmission of the data may be received, the coordinating entities comprising the second entity.

In a seventeenth aspect, in combination with one or more of the first aspect through the sixteenth aspect, the first entity is part of an unlicensed spectrum, and wherein the second entity is part of a licensed spectrum.

In an eighteenth aspect, in combination with one or more of the first aspect through the seventeenth aspect, the method further comprises monitoring the first entity for one or more other transmissions after monitoring for the retransmission of the data.

In a nineteenth aspect, in combination with the eighteenth aspect, the method further comprises receiving an indication, on the second entity, of when to begin monitoring the first entity for the one or more other transmissions.

In a twentieth aspect, in combination with one or more of the eighteenth aspect and the nineteenth aspect, the monitoring of the first entity for the one or more other transmissions begins upon expiration of a timer.

In a twenty-first aspect, in combination with the twentieth aspect, the timer starts after the initial transmission or after switching to the second entity for monitoring of the retransmission of the data.

In a twenty-second aspect, in combination with one or more of the eighteenth aspect through the twenty-first aspect, the retransmission of the data is received during a retransmission cycle, and wherein the monitoring of the first entity for the one or more other transmissions begins at an end of the retransmission cycle.

In a twenty-third aspect, in combination with one or more of the first aspect through the twenty-second aspect, the initial transmission is configured using semi-persistent scheduling (SPS).

In a twenty-fourth aspect, in combination with one or more of the first aspect through the twenty-third aspect, the first entity is part of a first frequency range (FR), and the second entity is part of a second frequency range (FR), the second FR having a lower subcarrier spacing (SCS) than the first FR.

In a twenty-fifth aspect, a method for wireless communication, comprises: transmitting an initial transmission of data to a UE on a first entity; receiving a negative acknowledgement message indicating that decoding of the initial transmission of the data was unsuccessful; and transmitting a retransmission of the data on a second entity after the transmission of the negative acknowledgement message, the second entity being different than the first entity.

In a twenty-sixth aspect, in combination with the twenty-fifth aspect, each of the first entity and the second entity is a frequency resource.

In a twenty-seventh aspect, in combination with one or more of the twenty-fifth aspect and the twenty-sixth aspect, each of the first entity and the second entity is a cell or a component carrier.

In a twenty-eighth aspect, in combination with one or more of the twenty-fifth aspect through the twenty-seventh aspect, the method further comprises transmitting control information indicating the second entity to be monitored for receiving the retransmission of the data.

In a twenty-ninth aspect, in combination with the twenty-eighth aspect, the control information is transmitted via the first entity.

In a thirtieth aspect, in combination with one or more of the twenty-eighth aspect and the twenty-ninth aspect, the control information is transmitted via the second entity.

In a thirty-first aspect, in combination with one or more of the twenty-eighth aspect through the thirtieth aspect, the control information comprises a HARQ process ID indicating the initial transmission of the data corresponding to the retransmission, and wherein the control information further comprises an HARQ anchoring entity ID associated with the HARQ process ID.

In a thirty-second aspect, in combination with one or more of the twenty-fifth aspect through the thirty-first aspect, further comprising: receiving an A/N message indicating whether the retransmission of the data was successfully decoded.

In a thirty-third aspect, in combination with the thirty-second aspect, the A/N message is received via a third entity.

In a thirty-fourth aspect, in combination with the thirty-third aspect, the third entity is configured for the first entity.

In a thirty-fifth aspect, in combination with one or more of the thirty-third aspect and the thirty-fourth aspect, the third entity is configured for the second entity.

In a thirty-sixth aspect, in combination with one or more of the twenty-fifth aspect through the thirty-fifth aspect, the method further comprises transmitting an indication of coordinating entities on which the retransmission of the data may be received, the coordinating entities comprising the second entity.

In a thirty-seventh aspect, in combination with one or more of the twenty-fifth aspect through the thirty-sixth aspect, the first entity is part of an unlicensed spectrum, and wherein the second entity is part of a licensed spectrum.

In a thirty-eighth aspect, in combination with one or more of the twenty-fifth aspect through the thirty-seventh aspect, further comprising transmitting one or more other transmissions on the first entity after the retransmission of the data.

In a thirty-ninth aspect, in combination with the thirty-eighth aspect, the method further comprises transmitting an indication, on the second entity, of when to begin monitoring the first entity for the one or more other transmissions.

In a fortieth aspect, in combination with one or more of the twenty-fifth aspect through the thirty-ninth aspect, the initial transmission is configured using SPS.

In a forty-first aspect, in combination with one or more of the twenty-fifth aspect through the fortieth aspect, the first entity is part of a first FR, and the second entity is part of a second FR, the second FR having a lower SCS than the first FR.

In a forty-second aspect, a method for wireless communication, comprises: transmitting an initial transmission of data to a network on a first entity; generating a retransmission of the data; and transmitting the retransmission of the data on a second entity, the second entity being different than the first entity.

In a forty-third aspect, in combination with the forty-second aspect, each of the first entity and the second entity is a frequency resource.

In a forty-fourth aspect, in combination with one or more of the forty second aspect and the forty-third aspect, each of the first entity and the second entity is a cell or a component carrier.

In a forty-fifth aspect, in combination with one or more of the forty second aspect through the forty-fourth aspect, the method further comprises receiving control information indicating the second entity to be used for transmitting the retransmission of the data.

In a forty-sixth aspect, in combination with the forty-fourth aspect, the control information is received via the first entity.

In a forty-seventh aspect, in combination with one or more of the forty-fifth aspect and the forty-sixth aspect, the control information is received via the second entity.

In a forty-eighth aspect, in combination with one or more of the forty-fifth aspect through the forty-seventh aspect, the control information comprises a HARQ process ID indicating the initial transmission of the data corresponding to the retransmission, and wherein the control information further comprises an HARQ anchoring entity ID associated with the HARQ process ID.

In a forty-ninth aspect, in combination with one or more of the forty-second aspect through the forty-eighth aspect, the method is performed by a UE, the UE being preconfigured to transmit, via the second entity, the retransmission of the data In a fiftieth aspect, in combination with one or more of the forty-second aspect through the forty-ninth aspect, the method further comprises receiving an indication of coordinating entities on which the retransmission of the data may be transmitted, the coordinating entities comprising the second entity.

In a fifty-first aspect, in combination with one or more of the forty-second aspect through the fiftieth aspect, the first entity is part of an unlicensed spectrum, and wherein the second entity is part of a licensed spectrum.

In a fifty-second aspect, in combination with one or more of the forty-second aspect through the fifty-first aspect, the initial transmission is configured using a configured grant (CG).

In a fifty-third aspect, in combination with one or more of the forty-second aspect through the fifty-second aspect, the first entity is part of a first FR, and the second entity is part of a second FR, the second FR having a lower SCS than the first FR.

In a fifty-fourth aspect, a method for wireless communication, comprises: monitoring for an initial transmission of data from a UE on a first entity; and receiving a retransmission of the data on a second entity, the second entity being different than the first entity.

In a fifty-fifth aspect, in combination with the fifty-fourth aspect, each of the first entity and the second entity is a frequency resource.

In a fifty-sixth aspect, in combination with one or more of the fifty-fourth aspect and the fifty-fifth aspect, each of the first entity and the second entity is a cell or a component carrier.

In a fifty-seventh aspect, in combination with one or more of the fifty-fourth aspect through the fifty-sixth aspect, the method further comprises transmitting control information indicating the second entity to be used for transmission of the retransmission of the data.

In a fifty-eighth aspect, in combination with the fifty-seventh aspect, the control information is transmitted via the first entity.

In a fifty-ninth aspect, in combination with one or more of the fifty-seventh aspect and the fifty-eighth aspect, the control information is transmitted via the second entity.

In a sixtieth aspect, in combination with one or more of the fifty-seventh aspect through the fifty-ninth aspect, the control information comprises a HARQ process ID indicating the initial transmission of the data corresponding to the retransmission, and wherein the control information further comprises an HARQ anchoring entity ID associated with the HARQ process ID.

In a sixty-first aspect, in combination with one or more of the fifty-fourth aspect through the sixtieth aspect, the method further comprises transmitting an indication of coordinating entities on which the retransmission of the data may be transmitted, the coordinating entities comprising the second entity.

In a sixty-second aspect, in combination with one or more of the fifty-fourth aspect through the sixty-first aspect, the first entity is part of an unlicensed spectrum, and wherein the second entity is part of a licensed spectrum.

In a sixty-third aspect, in combination with one or more of the fifty-fourth aspect through the sixty-second aspect, the initial transmission is configured using a CG.

In a sixty-fourth aspect, in combination with one or more of the fifty-fourth aspect through the sixty-third aspect, the first entity is part of a first FR, and the second entity is part of a second FR, the second FR having a lower SCS than the first FR.

In a sixty-fifth aspect, an apparatus for wireless communication, comprises: a memory; and one or more processors coupled to the memory, the one or more processors and the memory being configured to: monitor for an initial transmission of data from a network on a first entity; generate a negative acknowledgement message indicating that decoding of the initial transmission of the data was unsuccessful; transmit the negative acknowledgement message; and monitor for a retransmission of the data on a second entity after the transmission of the negative acknowledgement message, the second entity being different than the first entity.

In a sixty-sixth aspect, an apparatus for wireless communication, comprises: means for monitoring for an initial transmission of data from a network on a first entity; means for generating a negative acknowledgement message indicating that decoding of the initial transmission of the data was unsuccessful; means for transmitting the negative acknowledgement message; and means for monitoring for a retransmission of the data on a second entity after the transmission of the negative acknowledgement message, the second entity being different than the first entity.

In a sixty-seventh aspect, a computer readable medium having computer executable code stored thereon for wireless communication, comprises: code for monitoring for an initial transmission of data from a network on a first entity; code for generating a negative acknowledgement message indicating that decoding of the initial transmission of the data was unsuccessful; code for transmitting the negative acknowledgement message; and code for monitoring for a retransmission of the data on a second entity after the transmission of the negative acknowledgement message, the second entity being different than the first entity.

In a sixty-eighth aspect, an apparatus for wireless communication, comprises a memory; and one or more processors coupled to the memory, the one or more processors and the memory being configured to: transmit an initial transmission of data to a UE on a first entity; receive a negative acknowledgement message indicating that decoding of the initial transmission of the data was unsuccessful; and transmit a retransmission of the data on a second entity after the transmission of the negative acknowledgement message, the second entity being different than the first entity. In a sixty-ninth aspect, an apparatus for wireless communication, comprises: means for transmitting an initial transmission of data to a UE on a first entity; means for receiving a negative acknowledgement message indicating that decoding of the initial transmission of the data was unsuccessful; and means for transmitting a retransmission of the data on a second entity after the transmission of the negative acknowledgement message, the second entity being different than the first entity.

In a seventieth aspect, a computer readable medium having computer executable code stored thereon for wireless communication, comprises: code for transmitting an initial transmission of data to a UE on a first entity; code for receiving a negative acknowledgement message indicating that decoding of the initial transmission of the data was unsuccessful; and code for transmitting a retransmission of the data on a second entity after the transmission of the negative acknowledgement message, the second entity being different than the first entity.

In a seventy-first aspect, an apparatus for wireless communication, comprises: a memory; and one or more processors coupled to the memory, the one or more processors and the memory being configured to: transmit an initial transmission of data to a network on a first entity; generate a retransmission of the data; and transmit the retransmission of the data on a second entity, the second entity being different than the first entity.

In a seventy-second aspect, an apparatus for wireless communication, comprises: means for transmitting an initial transmission of data to a network on a first entity; means for generating a retransmission of the data; and means for transmitting the retransmission of the data on a second entity, the second entity being different than the first entity.

In a seventy-third aspect, a computer readable medium having computer executable code stored thereon for wireless communication, comprises: code for transmitting an initial transmission of data to a network on a first entity; code for generating a retransmission of the data; and code for transmitting the retransmission of the data on a second entity, the second entity being different than the first entity.

In a seventy-fourth aspect, an apparatus for wireless communication, comprises: a memory; and one or more processors coupled to the memory, the one or more processors and the memory being configured to: monitor for an initial transmission of data from a user-equipment UE on a first entity; and receive a retransmission of the data on a second entity, the second entity being different than the first entity.

In a seventy-fifth aspect, an apparatus for wireless communication, comprises: means for monitoring for an initial transmission of data from a UE on a first entity; and means for receiving a retransmission of the data on a second entity, the second entity being different than the first entity.

In a seventy-sixth aspect, a computer readable medium having computer executable code stored thereon for wireless communication, comprises: code for monitoring for an initial transmission of data from a UE on a first entity; and code for receiving a retransmission of the data on a second entity, the second entity being different than the first entity.

In a seventy-seventh aspect, an apparatus for wireless communication includes a processor, memory coupled with the processor, the processor and memory configured to perform a method of any one of the first aspect to the sixty-fourth aspect.

In a seventy-eighth aspect, an apparatus for wireless communication includes at least one means for performing a method of any one of the first aspect to the sixty-fourth aspect.

In a seventy-ninth aspect, a non-transitory computer-readable medium storing code for wireless communication includes a processor, memory coupled with the processor, and instructions stored in the memory and executable by the processor to cause the apparatus to perform a method of any one of the first aspect to the sixty-fourth aspect.

Figure 11:
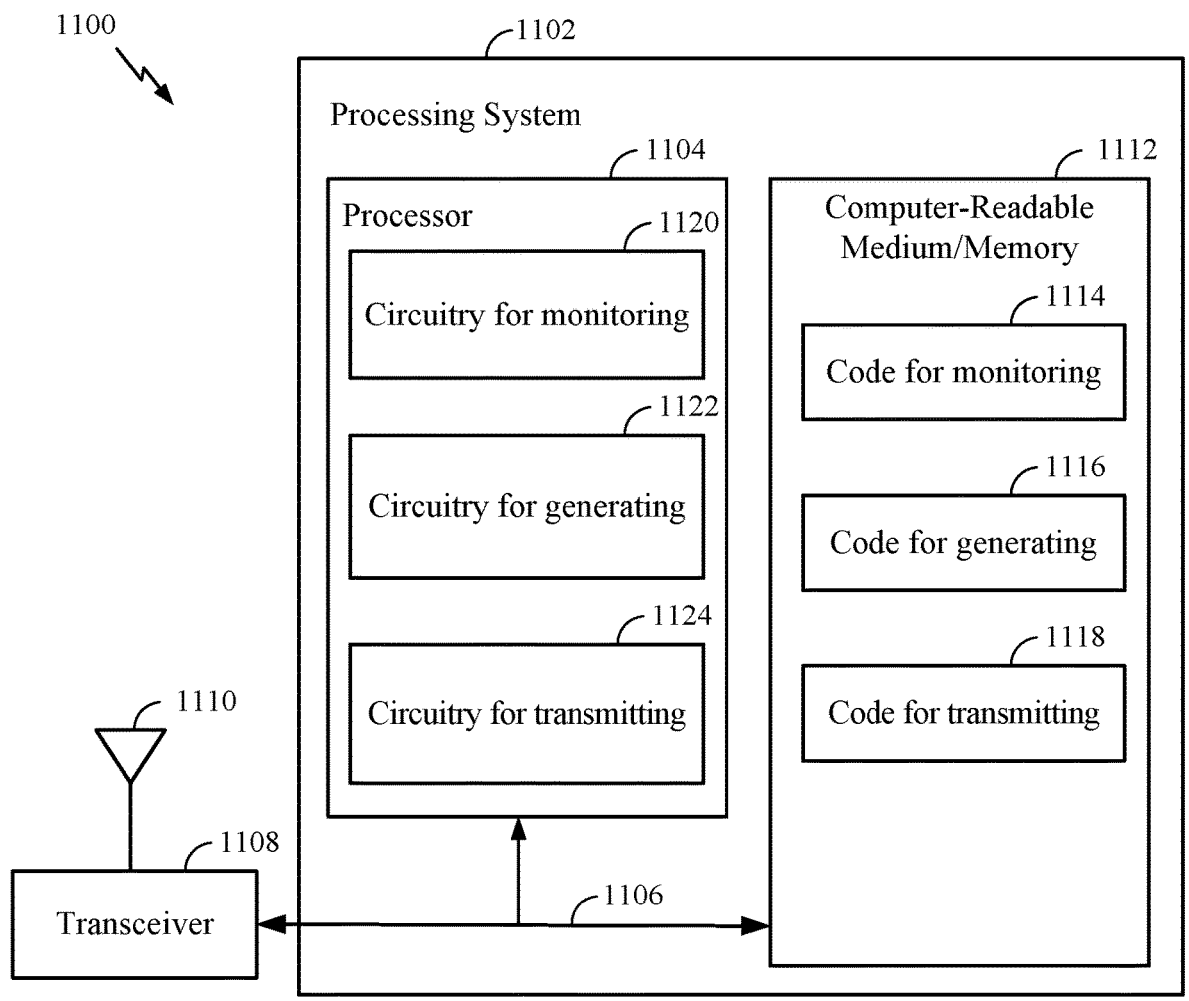
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 4 and 7. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 4 and 7, or other operations for performing the various techniques discussed herein for cross-carrier retransmission. In certain aspects, computer-readable medium/memory 1112 stores code 1114 for monitoring; code 1116 for generating, code 1118 for transmitting. In certain aspects, the processor 1104 has circuitry configured to implement the code stored in the computer-readable medium/memory 1112. The processor 1104 includes circuitry 1120 for monitoring; circuitry 1122 for generating, and circuitry 1124 for transmitting.

Figure 12:
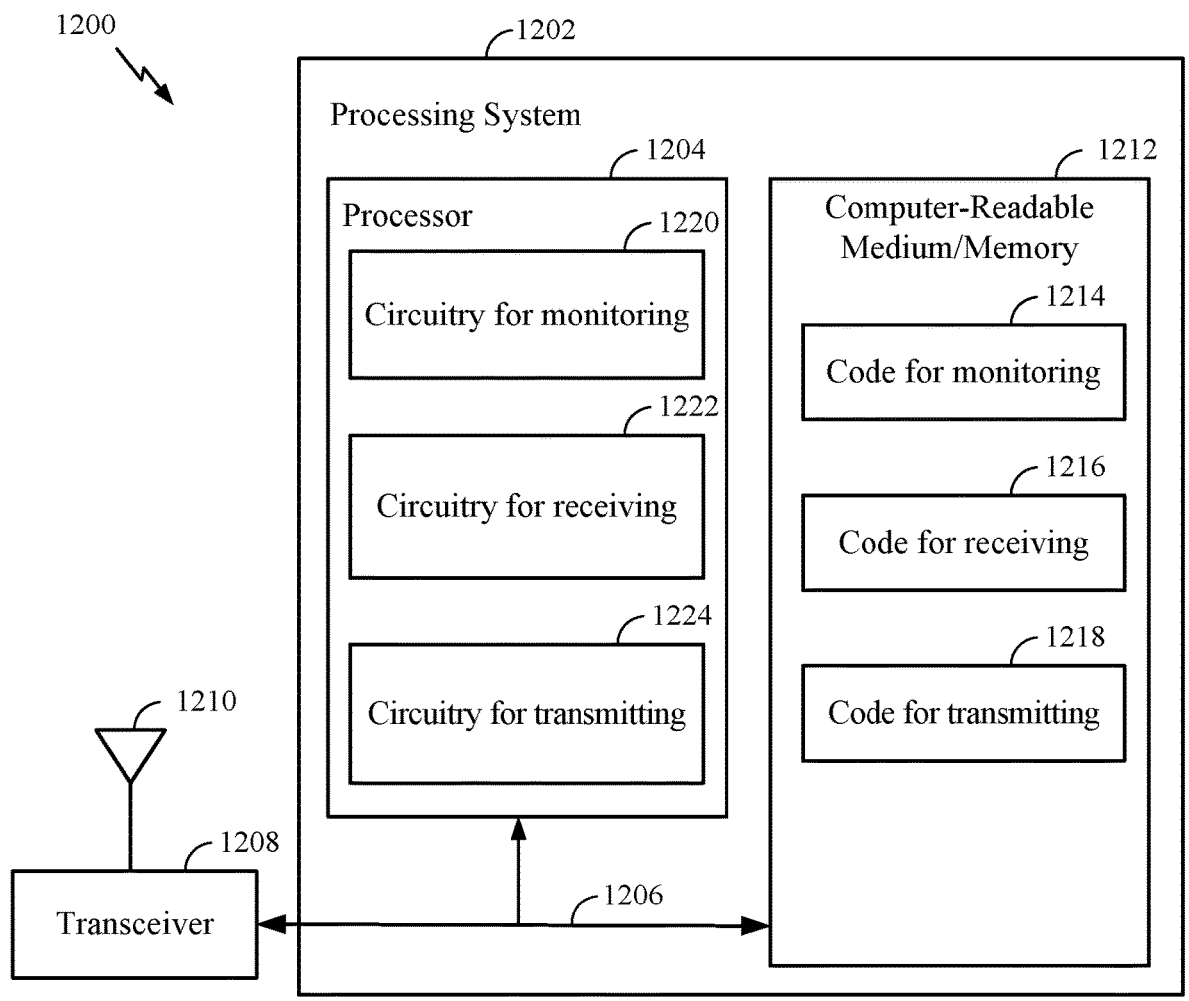
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 5 and 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIGS. 5 and 8, or other operations for performing the various techniques discussed herein for cross-carrier retransmission. In certain aspects, computer-readable medium/memory 1212 stores code 1214 for monitoring; code 1216 for receiving, code 1218 for transmitting. In certain aspects, the processor 1204 has circuitry configured to implement the code stored in the computer-readable medium/memory 1212. The processor 1204 includes circuitry 1220 for monitoring; circuitry 1222 for receiving, and circuitry 1224 for transmitting.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 13 illustrates example components of BS 110a and UE 120a (e.g., in the wireless communication network 100 of FIG. 1), which may be used to implement aspects of the present disclosure.

At the BS 110a, a transmit processor 1320 may receive data from a data source 1312 and control information from a controller/processor 1340. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1320 may process (e.g., encode and symbol map) the data and control information to obtain data symbols and control symbols, respectively. The transmit processor 1320 may also generate reference symbols, such as for the primary synchronization signal (PSS), secondary synchronization signal (SSS), and cell-specific reference signal (CRS). A transmit (TX) multiple-input multiple-output (MIMO) processor 1330 may perform spatial processing (e.g., precoding) on the data symbols, the control symbols, and/or the reference symbols, if applicable, and may provide output symbol streams to the modulators (MODs) 1332a-1332t. Each modulator 1332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1332a-1332t may be transmitted via the antennas 1334a-1334t, respectively.

At the UE 120a, the antennas 1352a-1352r may receive the downlink signals from the BS 110a and may provide received signals to the demodulators (DEMODs) in transceivers 1354a-1354r, respectively. Each demodulator 1354 may condition (e.g., filter, amplify, downconvert, and digitize) a respective received signal to obtain input samples. Each demodulator may further process the input samples (e.g., for OFDM, etc.) to obtain received symbols. A MIMO detector 1356 may obtain received symbols from all the demodulators 1354a-1354r, perform MIMO detection on the received symbols if applicable, and provide detected symbols. A receive processor 1358 may process (e.g., demodulate, deinterleave, and decode) the detected symbols, provide decoded data for the UE 120a to a data sink 1360, and provide decoded control information to a controller/processor 1380.

On the uplink, at UE 120a, a transmit processor 1364 may receive and process data (e.g., for the PUSCH) from a data source 1362 and control information (e.g., for the PUCCH) from the controller/processor 1380. The transmit processor 1364 may also generate reference symbols for a reference signal (e.g., for the SRS). The symbols from the transmit processor 1364 may be precoded by a TX MIMO processor 1366 if applicable, further processed by the demodulators in transceivers 1354a-1354r (e.g., for SC-FDM, etc.), and transmitted to the BS 110a. At the BS 110a, the uplink signals from the UE 120a may be received by the antennas 1334, processed by the modulators 1332, detected by a MIMO detector 1336 if applicable, and further processed by a receive processor 1338 to obtain decoded data and control information sent by the UE 120a. The receive processor 1338 may provide the decoded data to a data sink 1339 and the decoded control information to the controller/processor 1340.

The memories 1342 and 1382 may store data and program codes for BS 110a and UE 120a, respectively. A scheduler 1344 may schedule UEs for data transmission on the downlink and/or uplink.

The controller/processor 1380 and/or other processors and modules at the UE 120a may perform or direct the execution of processes for the techniques described herein. For example, as shown in FIG. 13, the controller/processor 1340 of the BS 110a has a cross-carrier manager 112 that may be configured for cross-carrier retransmission, according to aspects described herein. As shown in FIG. 13, the controller/processor 1380 of the UE 120a has a cross-carrier manager 122 that may be configured for cross-carrier retransmission, according to aspects described herein. Although shown at the Controller/Processor, other components of the UE 120a and BS 110a may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
monitoring for an initial transmission of data from a network on a first entity;
generating a negative acknowledgement message indicating that decoding of the initial transmission of the data was unsuccessful;
transmitting the negative acknowledgement message;
receiving control information indicating a second entity to be monitored for receiving a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
monitoring for the retransmission of the data on the second entity after the transmission of the negative acknowledgement message, the second entity being different than the first entity.

2. The method of claim 1, further comprising receiving control information indicating the second entity to be monitored for receiving the retransmission of the data, wherein the control information is received via the first entity.

3. The method of claim 1, further comprising receiving control information indicating the second entity to be monitored for receiving the retransmission of the data, wherein the control information is received via the second entity.

4. The method of claim 1, further comprising:
generating an acknowledgment/negative acknowledgment (A/N) message indicating whether the retransmission of the data was successfully decoded; and
transmitting the A/N message to the network.

5. The method of claim 4, wherein the A/N message is transmitted via a third entity.

6. The method of claim 1, further comprising receiving an indication of coordinating entities on which the retransmission of the data may be received, the coordinating entities comprising the second entity.

7. The method of claim 1, further comprising:
monitoring the first entity for one or more other transmissions after monitoring for the retransmission of the data; and
receiving an indication, on the second entity, of when to begin monitoring the first entity for the one or more other transmissions.

8. The method of claim 7, wherein the monitoring of the first entity for the one or more other transmissions begins upon expiration of a timer, wherein the timer starts after the initial transmission or after switching to the second entity for monitoring of the retransmission of the data.

9. A method for wireless communication, comprising:
transmitting an initial transmission of data to a user-equipment (UE) on a first entity;
receiving a negative acknowledgement message indicating that decoding of the initial transmission of the data was unsuccessful;
transmitting control information indicating a second entity to be monitored for receiving a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and transmitting the retransmission of the data on the second entity after the transmission of the negative acknowledgement message, the second entity being different than the first entity.

10. The method of claim 9, further comprising transmitting control information indicating the second entity to be monitored for receiving the retransmission of the data, wherein the control information is transmitted via the first entity.

11. The method of claim 9, further comprising transmitting control information indicating the second entity to be monitored for receiving the retransmission of the data, wherein the control information is transmitted via the second entity.

12. The method of claim 9, further comprising:
receiving an acknowledgment/negative acknowledgment (A/N) message indicating whether the retransmission of the data was successfully decoded.

13. The method of claim 12, wherein the A/N message is received via a third entity.

14. The method of claim 9, further comprising transmitting an indication of coordinating entities on which the retransmission of the data may be received, the coordinating entities comprising the second entity.

15. The method of claim 9, further comprising:
transmitting an indication, on the second entity, of when to begin monitoring the first entity for one or more other transmissions; and
transmitting the one or more other transmissions on the first entity after the retransmission of the data.

16. A method for wireless communication, comprising:
transmitting an initial transmission of data to a network on a first entity;
generating a retransmission of the data;
receiving control information indicating a second entity to be used for transmitting the retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
transmitting the retransmission of the data on the second entity, the second entity being different than the first entity.

17. The method of claim 16, wherein each of the first entity and the second entity is a frequency resource.

18. The method of claim 16, wherein each of the first entity and the second entity is a cell or a component carrier.

19. The method of claim 16, further comprising receiving control information indicating the second entity to be used for transmitting the retransmission of the data, wherein the control information is received via the first entity.

20. The method of claim 16, further comprising receiving control information indicating the second entity to be used for transmitting the retransmission of the data, wherein the control information is received via the second entity.

21. The method of claim 16, wherein the method is performed by a user-equipment (UE), the UE being preconfigured to transmit, via the second entity, the retransmission of the data.

22. The method of claim 16, further comprising receiving an indication of coordinating entities on which the retransmission of the data may be transmitted, the coordinating entities comprising the second entity.

23. A method for wireless communication, comprising:
monitoring for an initial transmission of data from a user-equipment (UE) on a first entity;
transmitting control information indicating a second entity to be used for transmission of a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
receiving the retransmission of the data on the second entity, the second entity being different than the first entity.

24. The method of claim 23, further comprising transmitting control information indicating the second entity to be used for transmission of the retransmission of the data, wherein the control information is transmitted via the first entity.

25. The method of claim 23, further comprising transmitting control information indicating the second entity to be used for transmission of the retransmission of the data, wherein the control information is transmitted via the second entity.

26. The method of claim 23, further comprising transmitting an indication of coordinating entities on which the retransmission of the data may be transmitted, the coordinating entities comprising the second entity.

27. An apparatus for wireless communication, comprising:
a memory; and
at least one processor coupled to the memory, wherein the at least one processor is configured to cause the apparatus to:
monitor for an initial transmission of data from a network on a first entity;
generate a negative acknowledgement message indicating that decoding of the initial transmission of the data was unsuccessful;
transmit the negative acknowledgement message;
receive control information indicating a second entity to be monitored for receiving a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
monitor for the retransmission of the data on the second entity after the transmission of the negative acknowledgement message, the second entity being different than the first entity.

28. The apparatus of claim 27, wherein the at least one processor is further configured to cause the apparatus to receive control information indicating the second entity to be monitored for receiving the retransmission of the data, wherein the control information is received via the first entity.

29. The apparatus of claim 27, wherein the at least one processor is further configured to cause the apparatus to receive control information indicating the second entity to be monitored for receiving the retransmission of the data, wherein the control information is received via the second entity.

30. The apparatus of claim 27, wherein the at least one processor is further configured to cause the apparatus to:
    generate an acknowledgment/negative acknowledgment (A/N) message indicating whether the retransmission of the data was successfully decoded; and
    transmit the A/N message to the network.

31. The apparatus of claim 30, wherein the A/N message is transmitted via a third entity.

32. The apparatus of claim 27, wherein the at least one processor is further configured to cause the apparatus to receive an indication of coordinating entities on which the retransmission of the data may be received, the coordinating entities comprising the second entity.

33. The apparatus of claim 27, wherein the at least one processor is further configured to cause the apparatus to:
    monitor the first entity for one or more other transmissions after monitoring for the retransmission of the data; and
    receive an indication, on the second entity, of when to begin monitoring the first entity for the one or more other transmissions.

34. The apparatus of claim 33, wherein the at least one processor is configured to cause the apparatus to monitor the first entity for the one or more other transmissions upon expiration of a timer, and wherein the timer starts after the initial transmission or after switching to the second entity for monitoring of the retransmission of the data.

35. An apparatus for wireless communication, comprising:
    a memory; and
    at least one processor coupled to the memory, wherein the at least one processor is configured to cause the apparatus to:
        transmit an initial transmission of data to a user-equipment (UE) on a first entity;
        receive a negative acknowledgement message indicating that decoding of the initial transmission of the data was unsuccessful;
        transmit control information indicating a second entity to be monitored for receiving a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
        transmit the retransmission of the data on the second entity after the transmission of the negative acknowledgement message, the second entity being different than the first entity.

36. The apparatus of claim 35, wherein the at least one processor is further configured to cause the apparatus to transmit control information indicating the second entity to be monitored for receiving the retransmission of the data, wherein the control information is transmitted via the first entity.

37. The apparatus of claim 35, wherein the at least one processor is further configured to cause the apparatus to transmit control information indicating the second entity to be monitored for receiving the retransmission of the data, wherein the control information is transmitted via the second entity.

38. The apparatus of claim 35, wherein the at least one processor is further configured to cause the apparatus to receive an acknowledgment/negative acknowledgment (A/N) message indicating whether the retransmission of the data was successfully decoded.

39. The apparatus of claim 38, wherein the A/N message is received via a third entity.

40. The apparatus of claim 35, wherein the at least one processor is further configured to cause the apparatus to transmit an indication of coordinating entities on which the retransmission of the data may be received, the coordinating entities comprising the second entity.

41. The apparatus of claim 35, wherein the at least one processor is further configured to cause the apparatus to:
    transmit an indication, on the second entity, of when to begin monitoring the first entity for one or more other transmissions; and
    transmit the one or more other transmissions on the first entity after the retransmission of the data.

42. An apparatus for wireless communication, comprising:
    a memory; and
    at least one processor coupled to the memory, wherein the at least one processor is configured to cause the apparatus to:
        transmit an initial transmission of data to a network on a first entity;
        generate a retransmission of the data;
        receive control information indicating a second entity to be used for transmitting the retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and
        transmit the retransmission of the data on the second entity, the second entity being different than the first entity.

43. The apparatus of claim 42, wherein each of the first entity and the second entity is a frequency resource.

44. The apparatus of claim 42, wherein each of the first entity and the second entity is a cell or a component carrier.

45. The apparatus of claim 42, wherein the at least one processor is further configured to cause the apparatus to receive control information indicating the second entity to be used for transmitting the retransmission of the data, wherein the control information is received via the first entity.

46. The apparatus of claim 42, wherein the at least one processor is further configured to cause the apparatus to receive control information indicating the second entity to be used for transmitting the retransmission of the data, wherein the control information is received via the second entity.

47. The apparatus of claim 42, wherein the at least one processor is further configured to cause the apparatus to receive an indication of coordinating entities on which the retransmission of the data may be transmitted, the coordinating entities comprising the second entity.

48. An apparatus for wireless communication, comprising:
    a memory; and
    at least one processor coupled to the memory, wherein the at least one processor is configured to cause the apparatus to:
        monitor for an initial transmission of data from a user-equipment (UE) on a first entity;

transmit control information indicating a second entity to be used for transmission of a retransmission of the data, wherein the control information comprises a hybrid automatic repeat request (HARQ) process identifier (ID) indicating the initial transmission of the data corresponding to the retransmission, and wherein the control information further comprises an HARQ anchoring entity ID associated with the HARQ process ID; and receive the retransmission of the data on the second entity, the second entity being different than the first entity.

49. The apparatus of claim 48, wherein the at least one processor is further configured to cause the apparatus to transmit control information indicating the second entity to be used for transmission of the retransmission of the data, wherein the control information is transmitted via the first entity.

50. The apparatus of claim 48, wherein the at least one processor is further configured to cause the apparatus to transmit control information indicating the second entity to be used for transmission of the retransmission of the data, wherein the control information is transmitted via the second entity.

51. The apparatus of claim 48, wherein the at least one processor is further configured to cause the apparatus to transmit an indication of coordinating entities on which the retransmission of the data may be transmitted, the coordinating entities comprising the second entity.

* * * * *